United States Patent Office 3,316,192
Patented Apr. 25, 1967

3,316,192
BLENDS COMPRISING POLYVINYL CHLORIDE, POLYMETHYL METHACRYLATE AND A STABILIZER

Arthur David Seibel, Parkersburg, W. Va., assignor to E. I. du Pont de Nemours and Company, Wilmington, Del., a corporation of Delaware
No Drawing. Filed Sept. 24, 1965, Ser. No. 490,136
6 Claims. (Cl. 260—23)

This application is a continuation-in-part of my application Ser. No. 221,858, filed Sept. 6, 1962, now abandoned.

This invention relates to the production of a new composition that may be injection molded, extruded or blow molded. More specifically, this invention relates to a blend of polyvinyl chloride and acrylic resin. Specifically, this invention relates to a blend of polyvinyl chloride and an acrylic resin selected from the class consisting of polymethyl methacrylate and copolymers of methyl methacrylate and lower alkyl acrylate.

The low cost and good physical properties of polyvinyl chloride make it a logical candidate for use as an injection molding powder. However, this polymer has such poor melt flow characteristics at temperatures below its decomposition temperature that its use has been almost totally excluded from this field. Only highly plasticized polyvinyl chloride has been used to any appreciable extent as an injection molding powder. This composition is unsatisfactory for many uses for the amount of plasticizer used is so large that the properties of the final product are greatly impaired.

It is the object of this invention to provide a molding powder having as its major constituent polyvinyl chloride. It is a further object of this invention to provide a polyvinyl chloride molding powder that can be injection molded without decomposition. It is a further object of this invention to provide a compatible blend of polyvinyl chloride and acrylic resins which blend is transparent. It is a further object of this invention to provide a blend of polyvinyl chloride and acrylic resin that can be formed into an extruded sheet, which sheet can then be formed by heat and pressure, without decomposition, to form useful articles. It is a further object of this invention to provide a blend of polyvinyl chloride and acrylic resin that can be blow molded. It is a further object of this invention to provide a polyvinyl chloride blend having increased impact resistance when subjected to mechanical shock. It is a further object of this invention to provide a polyvinyl chloride composition that is resistant to weathering and sunlight. Other objects of this invention will be apparent to one skilled in the art from the remainder of the specification.

The above objects are achieved and the aforementioned difficulties are overcome by combining polyvinyl chloride with a methyl methacrylate polymer containing up to 25 parts by weight lower alkyl acrylate in the presence of a dehydrochlorination inhibitor, a bivalent sulfur compound, and an acid acceptor. If the dehydrochlorination inhibitor contains a salt of a fatty acid, it is desirable to also include an organic phosphite. The impact resistance of the blend can be increased by adding a chlorinated polyethylene or a chlorosulfonated polyethylene to the polyvinyl chloride-acrylic resin blend.

The polyvinyl chloride polymer used in this invention includes commercially available homopolymers and copolymers in which the polymer consists predominantly of (—CH$_2$—CHCl—) units. Preferably, these polymers are of the intermediate or low molecular weight variety, i.e., they have inherent viscosities as determined by ASTM Method D–1243–60 within the range of .65 to 1.00.

The acrylic polymers useful herein include methyl methacrylate homopolymers, and copolymers of methyl methacrylate and lower alkyl (i.e. methyl, ethyl, propyl and butyl) acrylates having inherent viscosities of 0.3 to 0.6. The inherent viscosity measurements on the acrylic polymers were carried out using Cannon-Fenske Number 50 viscometers and using 0.50 g. of polymer per 100 ml. of solution in chloroform and a temperature of 20° C.

$$\text{Inherent viscosity} = \frac{2.303 \log \eta_r}{c}$$

where $$\eta_r = \frac{\text{flow time for solution}}{\text{flow time for solvent}}$$

$c$ = grams of polymer per 100 ml. of solution.

The amount of lower alkyl acrylate in the copolymer should not exceed 25% by weight of the copolymer. If the acrylic polymer is a homopolymer of methyl methacrylate, or a copolymer of methyl methacrylate and a lower alkyl acrylate containing less than about 5% by weight lower alkyl acrylate units, it is essential that the acrylic resin contain bivalent sulfur in the amount of .1 to 2% by weight of the acrylic resin. The bivalent sulfur may be present in the polymer as units of the polymer, or it may be added after the polymerization is complete and when the polyvinyl chloride is blended with the acrylic resin. Suitable bivalent sulfur compounds include those having the formula $R_1$—S—$R_2$ where $R_1$ is an organic radical having 1 to 20 carbon atoms and $R_2$ is an organic radical having 1 to 20 carbon atoms, or hydrogn. Preferably, $R_1$ and $R_2$ are alkyl radicals, either alike or dissimilar. The higher boiling sulfides, such as those wherein $R_1$ and $R_2$ are radicals containing at least 4 carbon atoms are preferred. Suitable sulfides include dimethyl sulfide, diethyl sulfide, di-n-propyl sulfide, di-n-heptyl sulfide, di-n-octyl sulfide, n-butyl lauryl sulfide, tertiary-octyl-n-butylsulfide, 2 ethyl hexyl sulfide, and tertiary dodecyl mercaptan.

Dehydrochlorination inhibitors useful in this invention include the following classes of compounds: (A) dialkyl tin mercaptides, such as dibutyl tin mercaptide; acetates, such as dipropyl tin diacetate and dibutyl tin diacetate; laurates, such as dibutyl tin dilaurate; maleates, such as dibutyl tin maleate; and alkoxides, such as dibutyl tin alkoxide having 1 to 10 carbon atoms in each alkyl group; fatty acid salts of metals of the class consisting of zinc, lead, cadmium, calcium, and strontium having 7 to 24 carbon atoms, such as the palmitate, stearate and laurate salts of these metals; barium phenolates, such as

and dialkyl zinc mercaptides having 1 to 10 carbon atoms, such as dibutyl zinc mercaptide; (B) epoxidized oils having 10 to 100 carbon atoms and an oxirane oxygen content of 5 to 10% by weight of the oil, such as lard oil, olive oil, castor oil, peanut oil, cottonseed oil, soybean oil, corn oil, linseed oil, and menhaden oil; diglycidyl ethers of polyhydric phenols having 17 to 50 carbon atoms, such as diglycidyl ether of hydroquinone; and 3.4 epoxy 6 methyl-cyclohexyl methyl 3:4 epoxy 6 methyl cyclohexane carboxylate; and (C) organic phosphites of the class of alkyl phosphites having 1-20 carbon atoms, such as trimethyl phosphite and triphenyl phosphite. Although all of the compounds listed in classes (A) and (B) inhibit dehydrochlorination when used alone, it is preferable to use a combination of one component of class (A) and one component from class (B), and when he component from class (A) is a fatty acid metal salt, one component from class (C) is preferably also employed. A synergistic result is achieved by selecting the ingredients of the dehydrochlorination inhibitor in this manner.

The total amount of dehydrochlorination inhibitor is preferably between 2 and 10 parts per 100 parts by weight of polyvinyl chloride; although greater amounts of inhibitor are satisfactory. Preferably between 1/3 and 2/3 of the inhibitor is from the class designated (B) above, and the remainder from (A) and (C).

If the final article molded from the blend of ingredients is to be used under conditions where it will be subjected to the degrading effect of ultra violet rays, it is desirable to include in the blend an ultra violet stabilizer such as a hydroxybenzophenone, or a benzotriazole in amounts of from 0.05 to 0.5 part by weight of the blend.

Blends of this invention have apparent viscosities in the range of 10,000 to 50,000 poises at 180° C. using a shear rate of 100 sec.$^{-1}$ and apparent viscosities in the range of 3,000 to 8,000 poises at 180° C. using a shear rate of 1000 sec.$^{-1}$.

The amount of polyvinyl chloride in the blend varies from 50 to 80 parts by weight per hundred parts of resin, and the amount of acrylic resin varies from 20 parts to 50 parts by weight per hundred parts of resin. Preferably, the ratio of polyvinyl chloride to acrylic resin is within the range of 55:45 to 65:35.

If it is desired to increase the impact resistance of the molded article, it is advisable to include chlorinated polyethylene or chlorosulfonated polyethylene. The amount of chlorine present in the chlorinated polyethylene should be between 20 and 60 parts per 100 parts of chlorinated polyethylene. The amount of sulfur and chlorine in the chlorosulfonated polyethylene should be between 20 and 60 parts per 100 parts of chlorosulfonated polyethylene. The ratio of chlorine to sulfur in the chlorosulfonated polyethylene should be between 10 and 40. The amount of chlorinated polyethylene or chlorosulfonated polyethylene in the polyvinyl chloride-acrylic resin blend should be within the range of 5 to 30% by weight of the blend. The melt index of the polyethylene base resin used for the chlorinated or chlorosulfonated polyethylene should be between 0.5 and 20, as measured in grams per 10 minutes at a temperature of 190° C. and a piston load of 2160 grams, with an orifice of 0.0825″ bore and a length of 0.315″.

In the following examples which illustrate the invention, all parts and percentages are in parts by weight unless otherwise specified.

*Example I*

Using a double-cone blender a dry blend was made containing 60 parts polyvinyl chloride having an inherent viscosity of 0.72, 40 parts methyl methacrylate-ethyl acrylate copolymer containing 13% ethyl acrylate and having an inherent viscosity of .45, 1.2 parts dibutyl tin mercaptide, 2 parts epoxidized linseed oil having about 57 carbon atoms and an oxirane oxygen content of about 9% by weight, and 0.1 part 2-(2′-hydroxy-5 methylphenyl) benzotriazole. This blend was processed through a 2-inch extruder having a length to diameter ratio of 15. Barrel temperatures were maintained between 290 to 360° F. and the stock temperature kept below 380° F. The melt was extruded as strands which were quenched and cut into 1/8″ pellets. The pellets were fed to a 6-oz. injection molding machine equipped with a rotating spreader. Cylinder temperatures were controlled between 300° F. to 360° F. with melt temperatures kept below 380° F. Using ram pressures between 10,000 and 20,000 p.s.i. and a cold mold, various transparent objects such as tumblers, combs and test bars were molded. The surface of molding was smooth and glossy.

Physical properties of test bars made by this experiment were as follows:

Tensile strength _____ p.s.i__ 9200
Elongation _____ percent__ 38
Stiffness _____ p.s.i__ 432M
Hardness _____ Rock. R__ 120
Heat distortion:
   66 p.s.i. _____ °C__ 80
   264 p.s.i. _____ °C__ 75
Izod impact:
   Notched _____ ft.-lb./in. notch__ 0.53
   Unnotched _____ ft.-lb__ 12
Self extinguishing _____ Yes
Specific gravity _____ 1.29
Light transmission _____ percent__ 88
Viscosity _____ ($^1$)

$^1$ 35,000 poises at 180° C. and a shear rate of 100 sec.$^{-1}$.

*Example II*

Because of the excellent compatibility of PVC and acrylic resins together with the good flow imparted by the acrylic, the dry blend made in Example I can be molded directly without precompounding on an extruder or roll mill. Best results are obtained when using a reciprocating screw machine or a conventional machine equipped with a rotating spreader. Physical properties are similar to tose shown for Example I except transparency is reduced slightly.

*Example III*

To the dry blend made in Example I, 30 parts of chlorinated polyethylene having a melt index of 3.5, containing 42 percent chlorine, was added. Thus blend was processed readily using the same conditions described in Example I. Molded objects such as combs, tumblers, and test bars were extremely tough and had surprisingly glossy, smooth surfaces which cannot be obtained by other rubber-modified plastics such as polystyrene. Bottles blown from this blend are tough and much stiffer than conventional blown bottles made of linear polyethylene.

Physical properties of test bars made by this experiment were as follows:

Tensile strength _____ p.s.i__ 5800
Elongation _____ percent__ 60
Stiffness _____ p.s.i__ 250M
Hardness _____ Rock. R__ 106
Heat distortion:
   66 p.s.i. _____ °C__ 74
   264 p.s.i. _____ °C__ 69
Izod impact:
   Notched _____ ft.-lb./in. notch__ 1.0
   Unnotched _____ ft.-lb__ 26
Self extinguishing _____ Yes
Specific gravity _____ 1.29

*Example IV*

To the dry blend in Example I, 30 parts of chlorosulfonated polyethylene, having a melt index of 3.5, containing 40 percent chlorine and 2 percent sulfur, were added. This blend can be processed readily using the same conditions described in Example I. The compounded blend was extruded and/or molded into a variety of tough, stiff objects having smooth, glossy surfaces. Physical properties are similar to those obtained in Example III, using chlorinated polyethylene as impact modifier.

*Example V*

To the dry blend in Example I, 30 parts of a chlorinated ethylene-methacrylic acid copolymer, having a composition consisting of 42 percent chlorine, 48 percent ethylene and 10 percent methacrylic acid, were added. The blend was extruded and milled easily using conventional equipment. Molded and/or extruded objects from this blend have properties similar to those shown in Example III but in addition transparency is improved and the tendency to stress whiten is reduced.

Example VI

A dry blend was made containing 60 parts polyvinyl chloride having an inherent viscosity of 0.72, 40 parts methyl methacrylate-ethyl acrylate copolymer containing 13 percent ethyl acrylate and having an inherent viscosity of 0.45, 1.8 parts of a mixed barium-cadmium palmitate, 0.6 part of triphenyl phosphite, and 2.0 parts epoxidized linseed oil having 57 carbon atoms and an oxirane oxygen content of 9%. The blend was processed through an extruder using conditions outlined in Example I. High quality, rigid, translucent moldings were made from the compounded blend by maintaining melt temperatures below 380° F. Physical properties were the same as those shown in Example I except the heat-distortion temperature was increased 3° C. and light transmission is reduced to 71 percent.

Example VII

A dry blend was made containing 60 parts polyvinyl chloride having an inherent viscosity of 0.72, 40 parts methyl methacrylate-ethyl acrylate copolymer containing 13 percent ethyl acrylate and having an inherent viscosity of 0.45, 1.0 part zinc stearate, 0.5 part calcium stearate and 2.0 parts epoxidized oil having about 90 carbon atoms and an oxirane oxygen content of about 7%. The blend was processed through an extruder and then injection molded. Stock temperatures should be kept below 180° C. Physical properties were similar to those shown in Example I except light transmission was reduced slightly.

Example VIII

A dry blend was made containing 60 parts polyvinyl chloride having an inherent viscosity of 0.72, 40 parts methyl methacrylate-ethyl acrylate copolymer containing 13 percent ethyl acrylate and having an inherent viscosity of 0.45, 3.0 parts lead laurate and 2.0 parts epoxidized oil having about 20 carbon atoms and an oxirane oxygen content of about 5%. The blend was processed through a roll mill and injection molded. Physical properties are similar to those shown in Example I except the blend was more colored and light transmission is reduced significantly.

Example IX

A blend having the same proportions of ingredients as Example I was prepared, except that no tin mercaptide or equivalent dehydrochlorination inhibitor was added. The thermal stability of the blend was reduced significantly for processing by extrusion or injection molding causing severe discoloration. The initial color of the extrudate at 380° F. was amber. The degradation reaction was autocatalyzed by evolved hydrochloric acid. After a few minutes, the extrudate turned black and excessive quantities of gas were given off.

Example X

A blend having the same proportion of ingredients as Example I was prepared, except that no epoxidized oil or equivalent material was included. The long-term stability of the resin was reduced. When this blend was molded at 380° F., the initial moldings were attractive, but after about 15 minutes, black degraded specks of polyvinyl chloride appeared in the moldings.

Example XI

A dry blend was made containing 60 parts polyvinyl chloride having an inherent viscosity of 0.72, 40 parts polymethyl methacrylate stabilized with 0.4 percent tertiary dodecyl mercaptan (based on methyl methacrylate) and having an inherent viscosity of 0.45, 1.2 parts dipropyl tin acetate and 2.0 parts epoxidized linseed oil having about 57 carbon atoms and an oxirane oxygen content of about 9% by weight. The blend was processed through an extruder maintaining melt temperatures below 380° F. Using ram pressures of 15,000 to 20,000 p.s.i. and a cold mold, the compounded polymer was molded into test bars having a smooth, glossy surface.

Physical properties of the test bars made by this experiment are as follows:

| | | |
|---|---|---|
| Tensile strength | p.s.i. | 9700 |
| Elongation | percent | 28 |
| Stiffness | p.s.i. | 447M |
| Heat distortion temp.: | | |
| 66 p.s.i. | °C | 82 |
| 264 p.s.i. | °C | 77 |
| Izod impact: | | |
| Notched | ft.-lb./in. notch | 0.53 |
| Unnotched | fl.-lb. | 12 |
| Self extinguishing | | Yes |
| Specific gravity | | 1.29 |
| Light transmission | percent | 88 |

Example XII

A blend having the same proportions of ingredients as Example XI was prepared, except that no tertiary dodecyl mercaptan or similar bivalent sulfur compound was present. The resulting blend was unstable at the required extrusion and molding temperatures. Moldings made from this polymethyl methacrylate-PVC blend contained bubbles and smears because of volatiles given off while heating the polymer in the cylinder.

Example XIII

A dry composition was made containing 100 parts polyvinyl chloride resin having an inherent viscosity of 0.7, 2 parts dibutyl tin mercaptide and 2 parts epoxidized linseed oil having about 57 carbon atoms and an oxirane oxygen content of about 9% by weight. This composition, containing no acrylic resin, was processed through an extruder using the same conditions as the acrylic blend described in Example I. The surface of the extrudate was extremely rough, the color poor, and the output was lower than for the blend of Example I. Adjustments were made to extrusion conditions in an attempt to improve the surface and color of the extrudate. When extrusion temperatures were lowered, color improved but the surface became so rough that strand stringup could not be maintained. As the extruder barrel and die temperatures were increased, the extrudate surface improved marginally, but ultimately polymer degradation occurred as the stock temperature exceeded 390 to 400° F. Pellets from this extruded composition were fed to a 6-oz. injection-molding machine equipped with a rotating spreader. Cylinder temperatures were controlled between 300° F. and 360° F. with melt temperatures kept below 380° F. These temperatures were identical to those used in Example I to mold PVC-acrylic blends. Using ram pressures of 10,000 to 20,000 p.s.i., an attempt was made to mold tumblers and test bars of the PVC composition. The polymer did not fill the mold under these conditions and the surface of the moldings was rough and unattractive. Satisfactory blow-molded containers from this blend could not be made because of high melt viscosity and poor surface characteristics.

Example XIV

A dry blend was made containing 40 parts polyvinyl chloride resin having an inherent viscosity of 0.72, 60 parts methyl methacrylate-ethyl acrylate copolymer containing 13 percent ethyl acrylate and having an inherent viscosity of 0.45, 0.8 part dibutyl tin mercaptide and 2 parts epoxidized linseed oil having about 57 carbon atoms and an oxirane oxygen content of about 9% by weight. This blend was processed through an extruder using the same conditions described in Example I. The blend was easy to process but the extrudate was somewhat hazy. Injection-molded bars made from this blend were mooth and glossy but were less transparent and more brittle than bars molded from the preferred blends containing 55 to 65 percent polyvinyl chloride and 35 to 45 percent acrylic resin. Further, the acrylic-rich blend made in this test was not self extinguishing.

*Example XV*

The process of Example I was repeated using an intermediate molecular weight polyvinyl chloride, having an inherent viscosity of 0.96, similar results being obtained. The blend was molded into test bars by using ram pressures about 2000–5000 p.s.i. greater than those used for blends containing low molecular weight PVC. Physical property data for this blend are substantially identical to those shown for Example I.

*Example XVI*

The process of Example I was repeated using a copolymer containing 90 percent vinyl chloride and 10 percent vinyl acetate. The resulting blend has excellent processibility and was molded and/or extruded readily using conditions described in Example I.

Objects molded from this blend were stiff, tough, hard, self extinguishing and somewhat translucent in appearance.

*Example XVII*

The process of Example VI was repeated and 0.1 percent of ultra violet absorber 2-hydroxy-4-n-dodecyloxy-benzophenone was added to the dry blend, the resulting blend was extruded and molded under the same conditions outlined in Example VI. Physical properties are not affected by addition of the hydroxybenzophenone, but for outdoor applications, the useful life of the molded or extruded objects was increased more than two-fold.

I claim:

1. A stable homogenous blend consisting essentially of polyvinyl chloride, and at least one acrylic resin of the class consisting of copolymers of methyl methacrylate and lower alkyl acrylates and methyl methacrylate homopolymer, said acrylic resin having an inherent viscosity of 0.3 to 0.6, when said acrylic resin is a copolymer, the amount of lower alkyl acrylate in said copolymer being 0.02 to 25% by weight of the copolymer, the amount of polyvinyl chloride in said blend being from 50 to 80 parts by weight per 100 parts of resin, the amount of acrylic resin in said blend being from 20 to 50 parts by weight per 100 parts of resin, when said acrylic resin contains less than about 5% lower alkyl acrylates, said acrylic resin containing at least one bivalent sulfur compound having the formula $R_1$—S—$R_2$ where $R_1$ is an organic radical containing 1 to 20 carbon atoms and $R_2$ is selected from the class consisting of hydrogen and organic radicals having 1 to 20 carbon atoms, said bivalent sulfur compound being present in said acrylic resin in an amount such that the sulfur content of said acrylic resin is .1 to 2% by weight of the acrylic resin, said blend being stabilized with at least one dehydrochlorination inhibitor selected from the class consisting of dialkyl tin mercaptides, dialkyl tin carboxylates, and dialkyl tin alkoxides, having 1 to 10 carbon atoms in each alkyl group, fatty acid salt of a metal of the class consisting of zinc, lead, cadmium, calcium, and strontium having 7 to 24 carbon atoms, barium phenolates, dialkyl zinc mercaptides having 1 to 10 carbon atoms in each alkyl group, epoxidized oils having 10 to 100 carbon atoms and an oxirane oxygen content of 5 to 10% by weight of the oil, diglycidyl ethers of polyhydric phenols having 17 to 50 carbon atoms, 3:4 epoxy 6-methyl-cyclohexyl methyl 3:4 epoxy 6-methyl cyclohexane carboxylate, alkyl phosphites having 1–20 carbon atoms and triphenyl phosphite, in the amount of .5 to 4% by weight of the blend, said blend having a viscosity range of 10,000 to 50,000 poises at 180° C. at a shear rate of 100 sec.$^{-1}$ and a viscosity range of 3,000 to 8,000 poises at 180° C. at a shear rate of 1,000 sec.$^{-1}$.

2. The composition of claim 1 which contains a synergistic combination of dehydrochlorination inhibitors at least one component of which is a member selected from the group consisting of (A) dialkyl tin mercaptides, carboxylates, and alkoxides having 1 to 10 carbon atoms in each alkyl group, a fatty acid salt of a metal of the class consisting of zinc, lead, cadmium, calcium and strontium having 7 to 24 carbon atoms; barium phenolates; and dialkyl zinc mercaptides having 1 to 10 carbon atoms in each alkyl group, at least one component of which is a member of the class consisting of (B) epoxidized oils having 10 to 100 carbon atoms and an oxirane oxygen content of 5 to 10% by weight of the oil, diglycidyl ethers of polyhydric phenols having 17 to 50 carbon atoms and 3:4 epoxy 6-methyl-cyclohexyl methyl 3:4 epoxy 6-methyl cyclohexane carboxylate; when said dehydrochlorination inhibitor contains a fatty acid salt, said combination also containing (C) an organic phosphite selected from the class consisting of alkyl phosphites having 1–20 carbon atoms in the alkyl group and triphenyl phosphite the member selected from the class designated (B) above being present in the amount of between ⅓ and ⅔ of the total weight of the dehydrochlorination inhibitors present, with the remainder being selected from classes (A) and (C).

3. The composition of claim 1 to which has been added an impact resistance modifier from the class consisting of chlorinated polyethylene and chlorosulfonated polyethylene in the amount of .5 to 30% by weight of the total composition of the blend in which the ethylene base resin from which the members of the class were produced had a melt index of between 0.5 and 20, and in which chlorine is present in the chlorinated polyethylene to the extent of between 20 and 60 parts per 100 parts of chlorinated polyethylene, and in which the amount of sulfur and chlorine in the chlorosulfonated polyethylene is between 20 and 60 parts per 100 parts of chlorosulfonated polyethylene, and the ratio of chlorine to sulfur in the chlorosulfonated polyethylene is between 10 and 40.

4. The composition of claim 1 in which the ratio of polyvinyl chloride to acrylic resin is within the range of 55:45 to 65:35.

5. The composition of claim 1 in the form of an extruded sheet.

6. The composition of claim 1 in the form of a blow molded object.

References Cited by the Examiner

UNITED STATES PATENTS

| | | | |
|---|---|---|---|
| 2,123,474 | 7/1938 | Redman | 260—899 |
| 2,311,249 | 2/1943 | Powell | 260—899 |
| 2,520,919 | 9/1950 | Forgie | 260—899 |
| 2,565,141 | 8/1951 | Marks | 260—45.7 |
| 2,646,417 | 7/1953 | Jennings | 260—898 |
| 2,753,322 | 7/1956 | Parks et al. | 260—899 |
| 2,791,600 | 5/1957 | Schwaegerle | 260—899 |
| 2,919,259 | 12/1959 | Naylor et al. | 260—45.75 |
| 2,997,454 | 8/1961 | Leistner et al. | 260—23 |
| 3,018,268 | 1/1962 | Daly | 260—899 |
| 3,041,309 | 6/1962 | Baer | 260—876 |
| 3,058,943 | 10/1962 | Gray et al. | 260—899 |
| 3,118,856 | 1/1964 | Salyer et al. | 260—899 |
| 3,145,187 | 8/1964 | Hankey et al. | 260—23 |
| 3,149,183 | 9/1964 | Salyer et al. | 260—897 |
| 3,202,628 | 8/1965 | Burd | 260—897 |

FOREIGN PATENTS 636,496   2/1962   Canada.

LEON J. BERCOVITZ, *Primary Examiner.*

R. A. WHITE, *Assistant Examiner.*